United States Patent
Wu

(10) Patent No.: US 9,854,007 B2
(45) Date of Patent: Dec. 26, 2017

(54) METHOD OF CONTROLLING PACKET SWITCHED DATA TRANSMISSION AND RELATED COMMUNICATION DEVICE

(75) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 57 days.

(21) Appl. No.: 13/100,293

(22) Filed: May 3, 2011

(65) Prior Publication Data

US 2011/0274045 A1 Nov. 10, 2011

Related U.S. Application Data

(60) Provisional application No. 61/331,392, filed on May 5, 2010.

(51) Int. Cl.
*H04L 29/06* (2006.01)
*H04W 76/04* (2009.01)
*H04W 36/00* (2009.01)
*H04W 48/18* (2009.01)

(52) U.S. Cl.
CPC ....... *H04L 65/1073* (2013.01); *H04W 76/041* (2013.01); *H04L 65/1059* (2013.01); *H04W 36/0022* (2013.01); *H04W 48/18* (2013.01)

(58) Field of Classification Search
CPC ..... H04W 80/04; H04W 84/12; H04W 88/06; H04W 76/041; H04W 36/0022; H04W 48/18; H04L 65/1073; H04L 65/1059
USPC ....... 370/328, 338, 352, 353, 354, 355, 356, 370/401, 465
See application file for complete search history.

(56) References Cited

U.S. PATENT DOCUMENTS

| 6,788,673 | B1 * | 9/2004 | Koskinen | H04M 1/663 370/352 |
| 7,061,894 | B2 * | 6/2006 | Pang | H04L 12/66 370/338 |
| 7,924,811 | B2 * | 4/2011 | Asokan | H04W 76/025 370/352 |
| 8,159,980 | B2 * | 4/2012 | Jappila | H04W 36/12 370/310 |
| 8,340,678 | B1 * | 12/2012 | Pandey | 455/452.2 |

(Continued)

FOREIGN PATENT DOCUMENTS

| CN | 101677337 A | 3/2010 |
| EP | 1895722 A1 | 3/2008 |

(Continued)

OTHER PUBLICATIONS

3GPP TS 24.301 V8.5.0 (Mar. 2010), "3rd Generation Partnership Project; Technical Specification Group Core Network and Terminals; Non-Access-Stratum (NAS) protocol for Evolved Packet System (EPS); Stage 3 (Release 8)", XP050402198, pp. 1-274.
Office action dated Jun. 4, 2012 for the European application No. 11003711.6, pp. 1-4.
3GPP TS 23.272 V9.3.0 3rd Generation Partnership Project; Technical Specification Group Services and System Aspects; Circuit Switched (CS) fallback in Evolved Packet System (EPS); Stage 2 (Release 9), Mar. 2010.

(Continued)

*Primary Examiner* — Christine Ng
(74) *Attorney, Agent, or Firm* — Winston Hsu

(57) ABSTRACT

A method of controlling packet switched data transmission functionality for a mobile device in a wireless communication system is disclosed. The method comprises disabling the packet switched data transmission functionality, and being allowed to initiate a telephony service via a circuit switched fallback functionality or via an internet protocol multimedia subsystem signaling even when the packet switched data transmission functionality is disabled.

18 Claims, 4 Drawing Sheets

(56) References Cited

U.S. PATENT DOCUMENTS

| | | | |
|---|---|---|---|
| 8,442,025 B2* | 5/2013 | Borsella | H04W 76/048 370/311 |
| 8,640,678 B2* | 2/2014 | Payne | F02M 31/10 123/549 |
| 2004/0001474 A1* | 1/2004 | Simelius | H04W 76/041 370/349 |
| 2005/0021592 A1* | 1/2005 | Patel | H04W 8/18 709/200 |
| 2005/0215241 A1* | 9/2005 | Okada | H04W 48/04 455/414.1 |
| 2007/0291670 A1* | 12/2007 | Pettersson | H04W 76/022 370/310 |
| 2008/0320149 A1 | 12/2008 | Faccin | |
| 2010/0056139 A1* | 3/2010 | Strittmatter | H04W 12/12 455/433 |
| 2010/0081435 A1 | 4/2010 | Huang | |
| 2010/0165948 A1* | 7/2010 | Ore | H04W 36/0033 370/331 |
| 2010/0297979 A1* | 11/2010 | Watfa | H04W 8/205 455/404.1 |
| 2011/0038372 A1* | 2/2011 | Wijayanathan | H04W 8/26 370/389 |
| 2011/0080867 A1* | 4/2011 | Mildh | H04W 76/02 370/328 |
| 2011/0103305 A1* | 5/2011 | Ali | H04W 76/062 370/328 |
| 2011/0200006 A1* | 8/2011 | Kwon | H04W 36/0011 370/331 |
| 2011/0235614 A1* | 9/2011 | Lerzer | H04W 76/021 370/331 |
| 2011/0275371 A1* | 11/2011 | Roger | H04W 60/04 455/435.1 |
| 2012/0069731 A1* | 3/2012 | Tooher | H04W 76/026 370/221 |

FOREIGN PATENT DOCUMENTS

| | | |
|---|---|---|
| EP | 1995986 A1 | 11/2008 |
| WO | 2007011638 A2 | 1/2007 |
| WO | 2007133526 A2 | 11/2007 |

OTHER PUBLICATIONS

European patent application No. 11003711.6, European Search Report dated Aug. 9, 2011.
European patent application No. 14020061.9, European Search Report dated Sep. 3, 2014.
3GPP TS 23.401 V9.4.0 (Mar. 2010), 3rd Generation Partnership Project; Technical Specification Group Services and System Aspects; General Packet Radio Service (GPRS) enhancements for Evolved Universal Terrestrial Radio Access Network (E-UTRAN) access (Release 9), XP050402066, p. 1-258.
Office Action dated Nov. 22, 2013 for the Taiwan application No. 100115788, filing date May 5, 2011, p. 1-8.
European Search report dated Jan. 5, 2015 for EP application No. 14020061.9, filed May 5, 2011.
Office action dated Feb. 25, 2016 for the Taiwan application No. 103144830, filing date May 5, 2011, p. 1-6.
Search Report dated Jul. 15, 2016 for EP application No. 16166627.6, pp. 1-9.
3GPP TS 24.301 V8.5.0 (Mar. 2010), "3rd Generation Partnership Project; Technical Specification Group Core Network and Terminals; Non-Access-Stratum (NAS) protocol for Evolved Packet System (EPS); Stage 3 (Release 8)", XP050402198, pp. 1-275.
3GPP TS 23.401 V9.4.0 (Mar. 2010), "3rd Generation Partnership Project; Technical Specification Group Services and System Aspects; General Packet Radio Service (GPRS) enhancements for Evolved Universal Terrestrial Radio Access Network (E-UTRAN) access (Release 9)", XP050402066, pp. 1-258.
3GPP TS 23.272 V9.3.0 (Mar. 2010), "3rd Generation Partnership Project; Technical Specification Group Services and System Aspects; Circuit Switched (CS) fallback in Evolved Packet System (EPS); Stage 2 (Release 9)", XP050402081, pp. 1-66.
Search Report dated Nov. 25, 2016 for EP application No. 16166627.6, pp. 1-8.
3GPP TS 23.272 V10.3.1 (Apr. 2011), "3rd Generation Partnership Project; Technical Specification Group Services and System Aspects; Circuit Switched (CS) fallback in Evolved Packet System (EPS); Stage 2 (Release 10)", XP050477124, pp. 1-78.
Office action dated Feb. 21, 2017 for the China application No. 201410257583.6, filing date May 5, 2011, p. 1-7.

* cited by examiner

METHOD OF CONTROLLING PACKET SWITCHED DATA TRANSMISSION AND RELATED COMMUNICATION DEVICE

CROSS REFERENCE TO RELATED APPLICATIONS

This application claims the benefit of U.S. Provisional Application No. 61/331,392, filed on May 5, 2010 and entitled "Method and Apparatus for controlling PS data transmission in a wireless communication system," the contents of which are incorporated herein in their entirety.

BACKGROUND OF THE INVENTION

1. Field of the Invention

The application relates to a method utilized in a wireless communication and a communication device thereof, and more particularly, to a method of controlling packet switched data transmission in a wireless communication system and a related communication device.

2. Description of the Prior Art

In contrast to the circuit switched model of previous cellular systems (e.g. general packet radio service (GPRS), or universal mobile telecommunications system (UMTS)), LTE system has been designed to support only packet switched (PS) services. It aims to provide seamless Internet Protocol (IP) connectivity between a user equipment (UE) and a packet data network (PDN) via an evolved packet system (EPS) bearer for accessing Internet, as well as for running services such as Voice over IP (VoIP) provided by IP Multimedia Subsystem (IMS). The PDN is responsible for IP address allocation to the UE. An EPS bearer is typically associated with a QoS. Multiple EPS bearers can be established for a user in order to provide different QoS streams or connectivity to different PDNs. For example, a UE can be engaged in a VoIP call while at the same time browsing a web page or downloading a file transfer protocol (FTP) file.

Moreover, the EPS bearer is established via the EPS bearer context activation. In addition, the EPS bearer context can be either a default bearer context or a dedicated bearer context. A default EPS bearer context is activated when the UE requests a connection to a PDN in order to provide the UE with always-on IP connectivity to that PDN. A dedicated EPS bearer context is linked to a default EPS bearer context and represents additional EPS bearer resources between the UE and the PDN. In attach procedure in LTE, the UE sends ATTACH REQUEST message together with a PDN CONNECTIVITY REQUEST message contained in the EPS Session Management (ESM) message container information element to request PDN connectivity. When MME receives the ATTACH REQUEST message, the MME sends the ACTIVATE DEFAULT EPS BEARER CONTEXT REQUEST message together with ATTACH ACCEPT to activate a default EPS bearer to a PDN. Note that, EPS bearer context in LTE system is translated to a packet data protocol (PDP) context in UMTS or GPRS.

Consider a scenario that a user may pay a lot of money due to accidentally activating data transmission/reception in a UE in a roaming network. Therefore, the UE supporting GPRS or UMTS (e.g. high-speed downlink packet access (HSDPA)/high-speed uplink packet access (HSUPA)) provides a user interface (UI) for the user to enable or disable PS data access (i.e. enable/disable data transmission in roaming). The PS data access is disabled by forbidding any PDP context activation, and thereby the user can save money during roaming. However, if the UE is roaming to LTE network (i.e. Evolved Universal Terrestrial Radio Access Network (E-UTRAN)) which supports only PS services, and is not allowed to activate the PDP context or EPS bearer context (namely PS data access is disabled), the UE cannot perform PS data transmission, and a default bearer context is not allowed to be activated either. Therefore, the UE cannot originate a call by circuit switched (CS) fallback functionality, or initiate an IMS based call (e.g. normal IMS call or IMS emergency call).

SUMMARY OF THE INVENTION

The application discloses a method of controlling packet switched data transmission in a wireless communication system and a related communication device in order to solve the abovementioned problems.

A method of controlling packet switched data transmission functionality for a mobile device in a wireless communication system is disclosed. The method comprises disabling the packet switched data transmission functionality, and being allowed to initiate a telephony service via a circuit switched fallback functionality or via an internet protocol multimedia subsystem signaling even when the packet switched data transmission functionality is disabled.

A method of controlling packet switched data transmission functionality for a mobile device in a wireless communication system is disclosed. The method comprises via a user interface to enable or disable a telephony service that the mobile device uses in a roaming service.

A method of controlling packet switched data transmission functionality for a mobile device in a wireless communication system is disclosed. The method comprises enabling or disabling the packet switched data transmission functionality based on a plurality of radio access technologies that the mobile device is compatible with.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
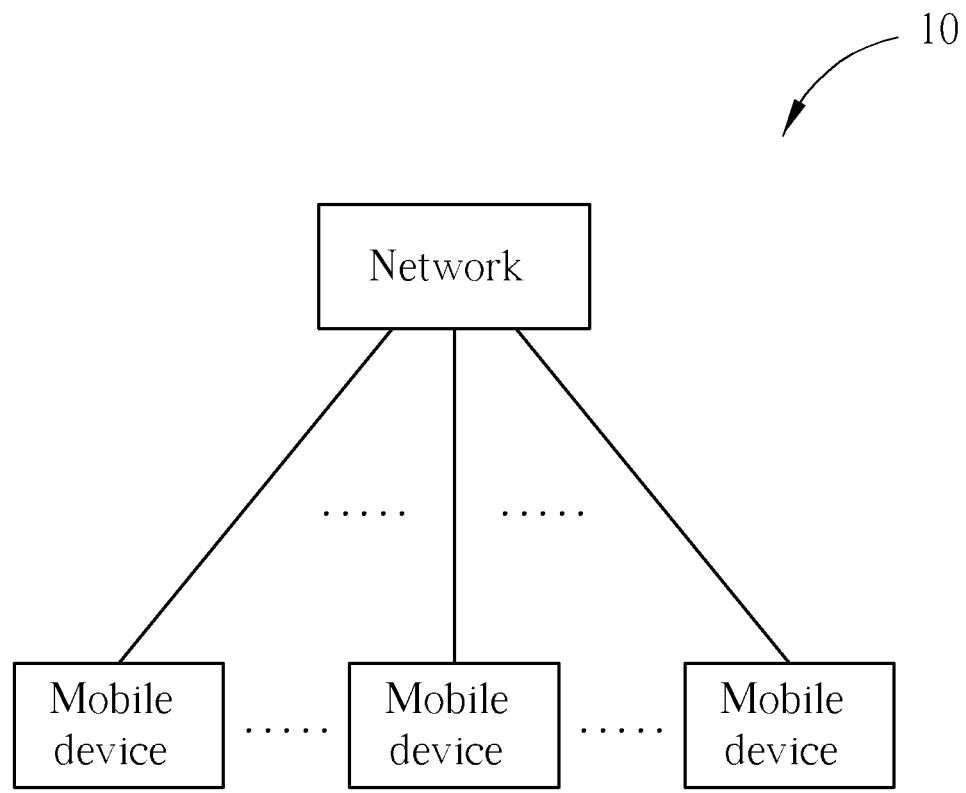
FIG. 1 is a schematic diagram of a wireless communication system.

Please refer to FIG. 1, which illustrates a schematic diagram of a wireless communication system 10 according to an embodiment of the present invention. Briefly, the wireless communication system 10 is composed of a network and a plurality of mobile devices. In FIG. 1, the network and the mobile devices are simply utilized for illustrating the structure of the wireless communication system 10. The wireless communication system 10 can be a Global System for Mobile communications (GSM) system, wideband code division multiple access (WCDMA), universal mobile telecommunications system (UMTS), long-term evolution (LTE) system or LTE-Advanced system. In the UMTS system, the network can be referred as a Universal Terrestrial Radio Access Network (UTRAN) comprising a plurality of base stations (Node Bs) and Radio Network Controllers (RNCs), whereas the mobile devices are referred as to user equipments (UEs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

In addition, in the UMTS system, before accessing a service in external network (e.g. Internet), the UE generally needs to perform a packet data protocol (PDP) context activation procedure to activate PDP contexts (routing information for tunneling packets) to a belonging serving general packet radio service (GPRS) support node (SGSN) and a specific gateway GPRS support node (GGSN), which can support the service. With usage of a maintained PDP context, the GGSN, which connects GPRS/UMTS networks (internal networks including UEs and corresponding SGSNs) with the external network, as a functional router and gateway, provides address mapping, packet switching and tunneling, packet counting, and routing between connected networks (from internal to external, or external to internal). Note that, in the LTE/LTE-Advance system, the GGSN may be referred to a packet data network gateway (P-GW), the SGSN to a serving gateway (S-GW), and the PDP context to an evolved packet system (EPS) bearer context. This shall be well-known in the art, so the detail is not given herein.

Figure 2:
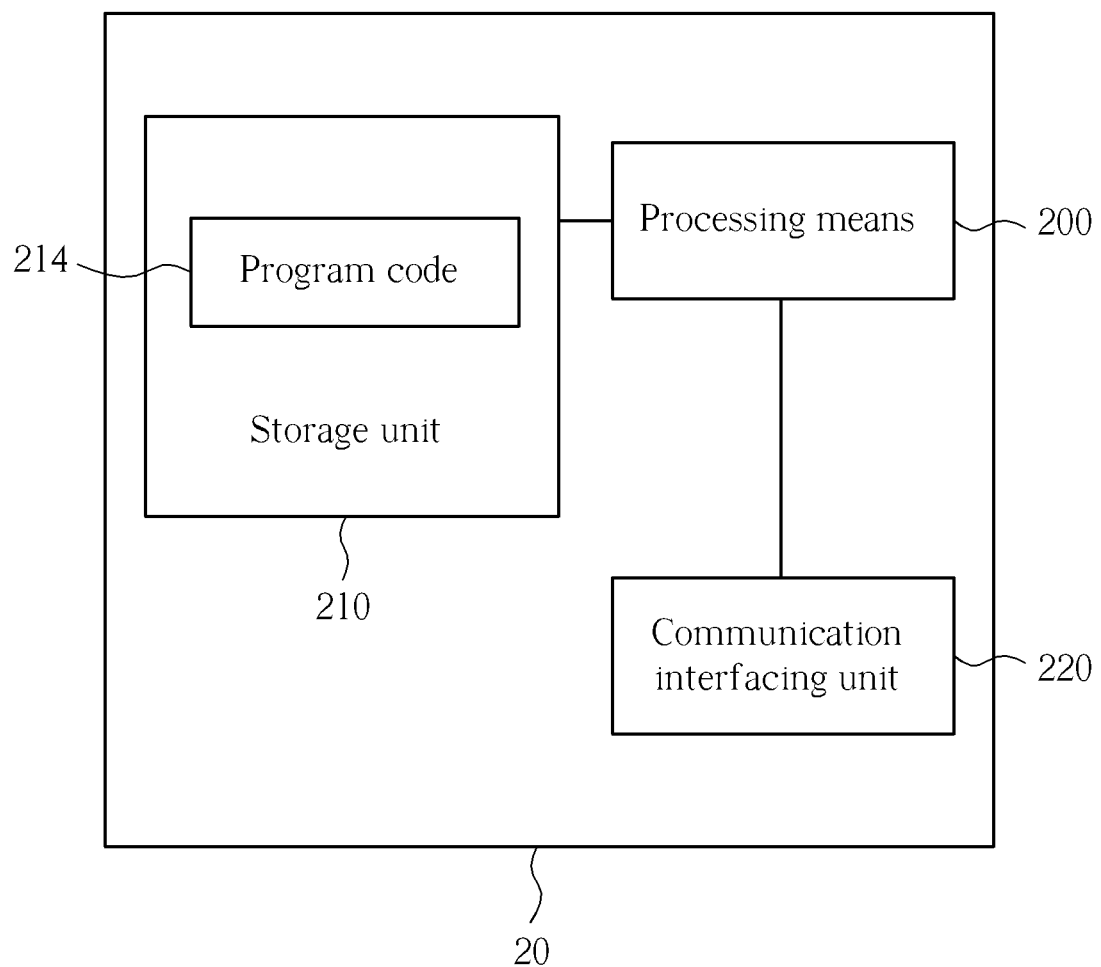
FIG. 2 is a schematic diagram of an exemplary communication device according to an embodiment.

FIG. 2 illustrates a schematic diagram of an exemplary communication device 20. The communication device 20 can be the mobile device shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
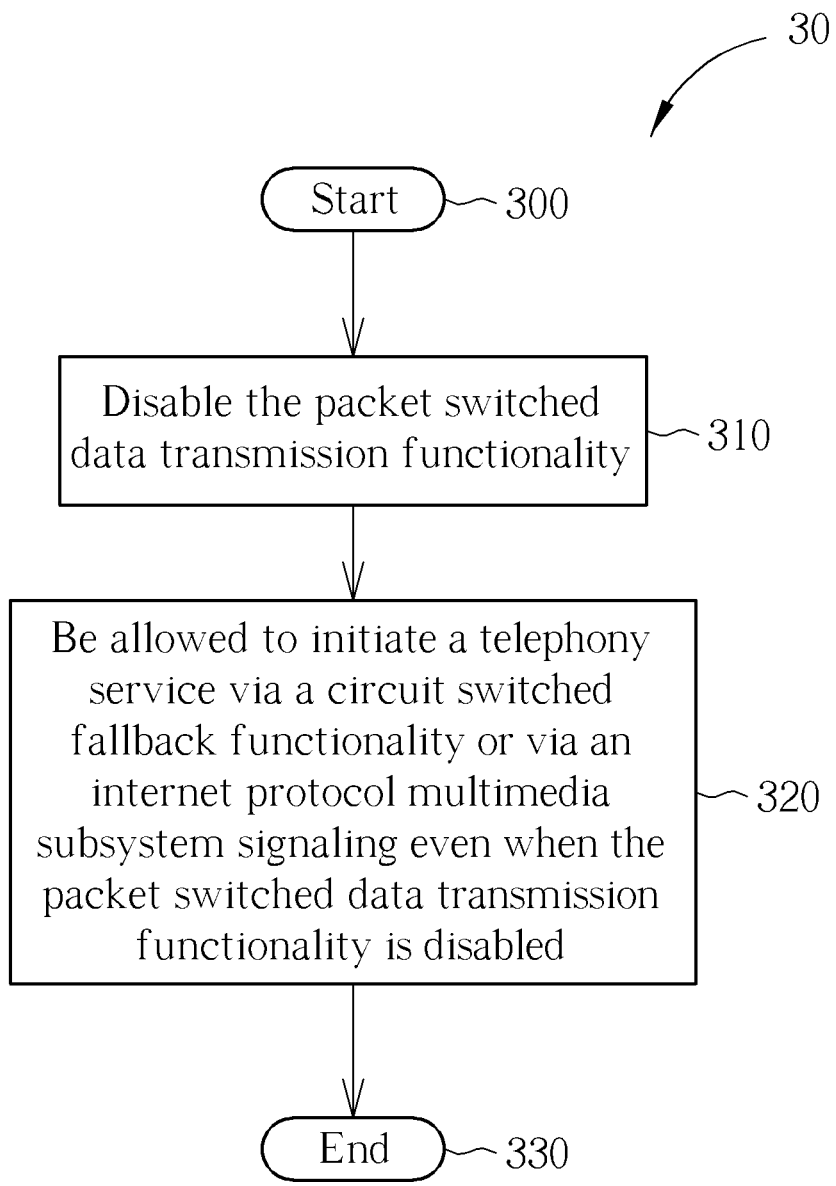
FIG. 3 is a flowchart of an exemplary process according to a first embodiment.

Please refer to FIG. 3, which illustrates a flowchart of an exemplary process 30. The process 30 is utilized in an UE (as the mobile device of FIG. 1) for controlling packet switched data transmission. The process 30 can be compiled into the program code 214 and includes the following steps:

Step 300: Start.

Step 310: Disable the packet switched data transmission functionality.

Step 320: Be allowed to initiate a telephony service via a circuit switched fallback functionality or via an internet protocol multimedia subsystem signaling even when the packet switched data transmission functionality is disabled.

Step 330: End.

According to the process 30, the UE whose packet switched data transmission functionality is disabled can initiate the telephony service (e.g. originate a call) via the circuit switched fallback functionality or initiate internet protocol multimedia subsystem (IMS) call (e.g. normal IMS call or IMS emergency call) if the UE is in the LTE/LTE-Advance system.

The telephony service is at least one of voice call, emergency call, short message service (SMS), video call, supplementary service provided by the network, and unstructured supplementary service data (USSD) for communicating with the network via text.

Referring back to FIG. 1, let's take an example associated with the system information reception based on the concept of the process 30. Assume an UE in UTRAN is handed over to or roaming to the E-UTRAN (namely from the UMTS system to the LTE/LTE-Advance system). The UE may have applications for automatically downloading email, weather forecasting, or stock information. In addition, the UE has a user interface (UI) for a user to disable or enable packet switched data transmission functionality. In order to save money during a roaming service in E-UTRAN, the user disables the packet switched data transmission functionality of the UE via the user interface. If the user wants to have a voice call, the UE is allowed to transmit packet switched data only for the voice call. In other words, the UE is forbidden to transmit packet switched data other than the data of the call. To achieve this, a packet filter is implemented in the UE to filter data, and thereby data (e.g. voice call data) that is configured by the user is allowed to transmit.

On the other hand, the UE is forbidden to activate any EPS bearer context other than a default EPS bearer context, so as to perform an attach procedure in LTE. The default EPS bearer context established in the attach procedure may be needed to perform circuit switched (CS) fallback functionality to initiate CS telephony service (e.g. voice call, emergency call, SMS, video call, USSD, etc) in UMTS. In other words, the UE deactivates all EPS bearer context other than the default EPS bearer context. If the UE supports IMS, the UE may activate an EPS bearer context for IMS telephony service (e.g. voice call, emergency call, SMS, video call, USSD, etc). In this case, the UE deactivates all EPS bearer context other than the default EPS bearer context and the EPS bearer context for the IMS telephony service.

Similarly, if the user disables the packet switched data transmission functionality of the UE in the UMTS, the UE is forbidden to activate any PDP context other than a PDP context which is used only for the voice call. In other words, the UE deactivates all PDP contexts other than the PDP context for the telephony service (e.g. voice call, emergency call, SMS, video call, USSD, etc).

Moreover, if the UE has a default EPS bearer context in the E-UTRAN and is handed over to or roaming to UMTS, the UE shall deactivate a PDP context corresponding to the default EPS bearer context when the packet switched data transmission functionality is disabled.

Based on the process 30, when a user disables packet switched data transmission functionality of the UE, and dials a call, the UE initiates the call either via circuit switched fallback functionality or via IMS signaling automatically without user intervention. Therefore, the UE can have telephony service even the user disables the packet switched data transmission functionality of the UE.

Figure 4:
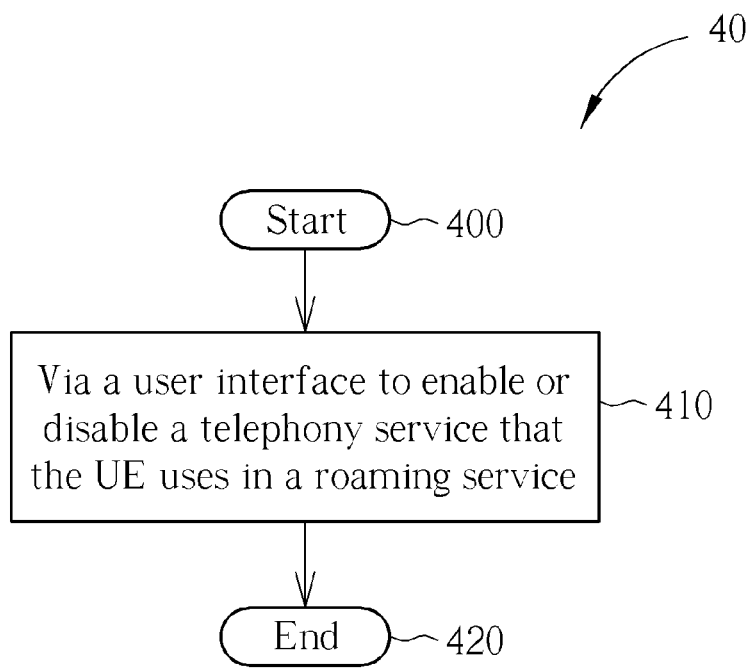
FIG. 4 is a flowchart of an exemplary process according to a second embodiment.

Please refer to FIG. 4, which illustrates a flowchart of a process 40 according to an example of the present application. The process 40 is utilized in an UE (as the mobile device of FIG. 1) for controlling packet switched data transmission. The process 40 can be compiled into the program code 214 and includes the following steps:

Step 400: Start.

Step 410: Via a user interface to enable or disable a telephony service that the UE uses in a roaming service.

Step 420: End.

According to the process 40, the telephony service is enabled or disabled via the user interface set in the UE. In a word, the telephony service is separately controlled in the UE during roaming. The telephony service is at least one of voice call, emergency call, SMS, video call, supplementary service, and USSD. Therefore, accidentally triggering the telephony service in a roaming network (e.g. the E-UTRAN) is avoided, so as to save money.

Figure 5:
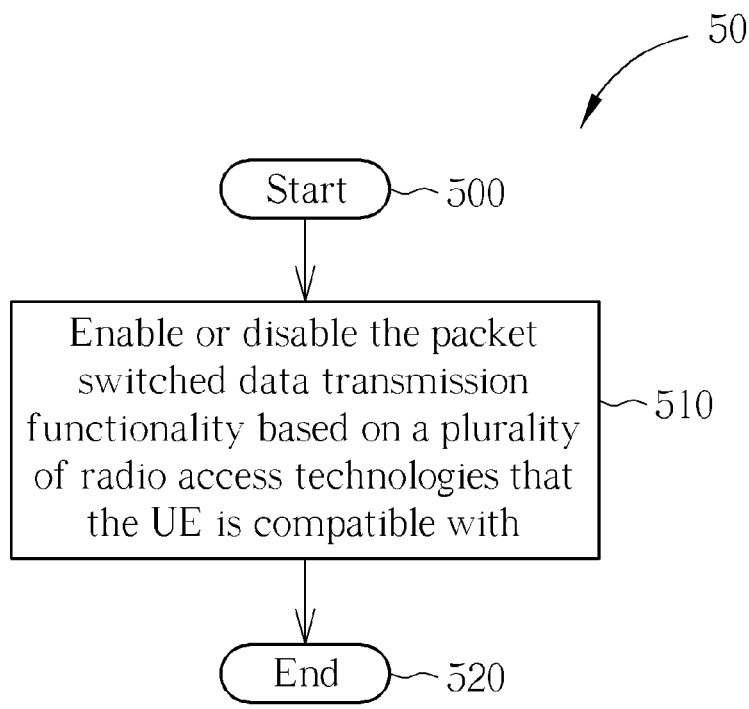
FIG. 5 is a flowchart of an exemplary process according to a third embodiment.

Please refer to FIG. 5, which illustrates a flowchart of a process 50 according to an example of the present application. The process 50 is utilized in an UE (as the mobile device of FIG. 1) for controlling packet switched data transmission. The process 50 can be compiled into the program code 214 and includes the following steps:

Step 500: Start.

Step 510: Enable or disable the packet switched data transmission functionality based on a plurality of radio access technologies that the UE is compatible with.

Step 520: End.

According to the process 50, a user can enable or disable the packet switched data transmission functionality of the UE based on a radio access technology (RAT). The RAT includes at least one of GSM (or called GPRS), UTRAN (or called WCDMA, UMTS) or E-UTRAN (or called LTE/LTE-Advanced). To achieve this, the UE has a user interface for the user to enable or disable the packet switched data transmission functionality in each RAT. Therefore, the user can set the UE with packet switched data transmission functionality in a first RAT (e.g. the E-UTRAN) and set the UE with no packet switched data transmission functionality in a second RAT (e.g. the UTRAN/GSM), so that packet switched data transmission can be well controlled.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary examples and means are provided for controlling the packet switched data transmission functionality of the UE, so as to avoid that the UE cannot initiate a call during roaming.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling packet switched data transmission functionality for a mobile device in a long term evolution (LTE) system, the method comprising:
    disabling the packet switched data transmission functionality by a microprocessor of the mobile device; and
    initiating an internet protocol multimedia subsystem (IMS) call to a network of the LTE system by the microprocessor even when the packet switched data transmission functionality is disabled and the mobile device is in the LTE system, such that the mobile device is allowed to transmit packet switched data for the IMS call.

2. The method of claim 1, wherein initiating the IMS call to the network of the LTE system by the microprocessor even when the packet switched data transmission functionality is disabled and the mobile device is in the LTE system comprises:
    being forbidden to transmit any packet switched data other than data for the IMS call.

3. The method of claim 1, wherein disabling the packet switched data transmission functionality by the microprocessor comprises:
    disabling the packet switched data transmission functionality in a roaming service.

4. The method of claim 1, wherein disabling the packet switched data transmission functionality by the microprocessor comprises:
    being forbidden to activate any packet switched data connection to the network of the LTE system other than a default packet switched data connection.

5. The method of claim 1, wherein disabling the packet switched data transmission functionality by the microprocessor comprises:
    being forbidden to activate any packet switched data connection to the network of the LTE system other than a default packet switched data connection and a packet switched data connection for the IMS call.

6. The method of claim 5, wherein the IMS call is at least one of voice call, emergency call, short message service (SMS), video call, supplementary service provided by the network, and unstructured supplementary service data (USSD) for communicating with the network via text.

7. The method of claim 5, wherein being forbidden to activate any packet switched data connection to the network of the LTE system other than the default packet switched data connection and the packet switched data connection for the IMS call comprises:
    deactivating all packet switched data connection to the network other than the default packet switched data connection and the packet switched data connection for the IMS call.

8. The method of claim 7, wherein the packet switched data connection for the IMS call is established via activating a default EPS bearer context in a first radio access technology (RAT) system supporting only packet switched data transmission, or via activating a packet data protocol (PDP) context in a second RAT system supporting packet switched data transmission and circuit switched data transmission.

9. The method of claim 8, further comprising:
    activating the default EPS bearer context in the first RAT system by the microprocessor; and
    being handed over to the second RAT system by the microprocessor;
    wherein disabling the packet switched data transmission functionality by the microprocessor comprises deactivating the PDP context corresponding to the default EPS bearer context.

10. A mobile device of a long term evolution (LTE) system for controlling packet switched data transmission functionality comprising:
    a microprocessor for executing a program; and
    a storage unit coupled to the microprocessor for storing the program; wherein the program instructs the microprocessor to perform the following steps:
    disabling the packet switched data transmission functionality; and initiating an internet protocol multimedia subsystem (IMS) call to a network of the LTE system even when the packet switched data transmission functionality is disabled and the mobile device is in the LTE system, such that the mobile device is allowed to transmit packet switched data for the IMS call.

11. The mobile device of claim 10, wherein initiating the IMS call to the network of the LTE system even when the packet switched data transmission functionality is disabled and the mobile device is in the LTE system comprises:
being forbidden to transmit any packet switched data other than data for the IMS call.

12. The mobile device of claim 10, wherein disabling the packet switched data transmission functionality comprises:
disabling the packet switched data transmission functionality in a roaming service.

13. The mobile device of claim 10, wherein disabling the packet switched data transmission functionality comprises:
being forbidden to activate any packet switched data connection to a network of the LTE system other than a default packet switched data connection.

14. The mobile device of claim 10, wherein disabling the packet switched data transmission functionality comprises:
being forbidden to activate any packet switched data connection to a network of the LTE system other than a default packet switched data connection and a packet switched data connection for the IMS call.

15. The mobile device of claim 14, wherein the IMS call is at least one of voice call, emergency call, short message service (SMS), video call, supplementary service provided by the network, and unstructured supplementary service data (USSD) for communicating with the network via text.

16. The mobile device of claim 14, wherein being forbidden to activate any packet switched data connection to the network of the LTE system other than the default packet switched data connection and the packet switched data connection for the IMS call comprises:
deactivating all packet switched data connection to the network other than the default packet switched data connection and the packet switched data connection for the IMS call.

17. The mobile device of claim 16, wherein the packet switched data connection for the IMS call is established via activating a default EPS bearer context in a first radio access technology (RAT) system supporting only packet switched data transmission, or via activating a packet data protocol (PDP) context in a second RAT system supporting packet switched data transmission and circuit switched data transmission.

18. The mobile device of claim 17, wherein the steps further comprising:
activating the default EPS bearer context in the first RAT system; and
being handed over to the second RAT system;
wherein disabling the packet switched data transmission functionality comprises deactivating the PDP context corresponding to the default EPS bearer context.

* * * * *